J. O. TRAUTWEIN.
CHART HOLDER.
APPLICATION FILED MAR. 17, 1920.
1,416,141.  Patented May 16, 1922.
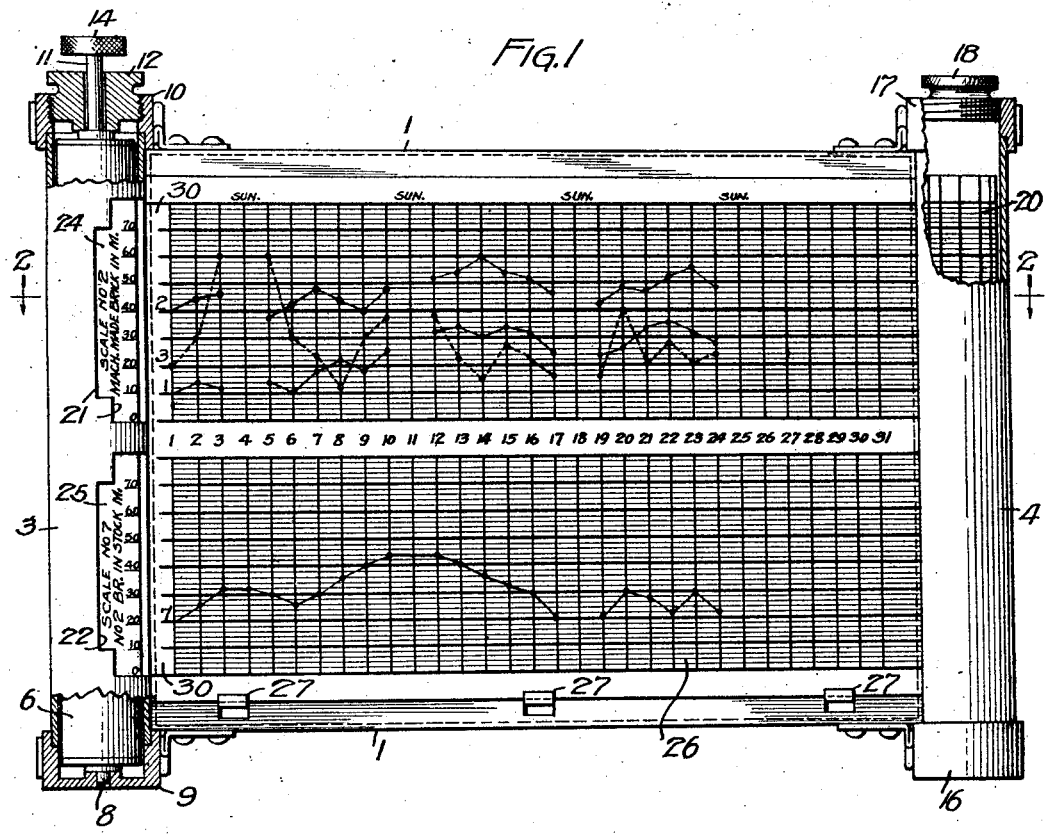
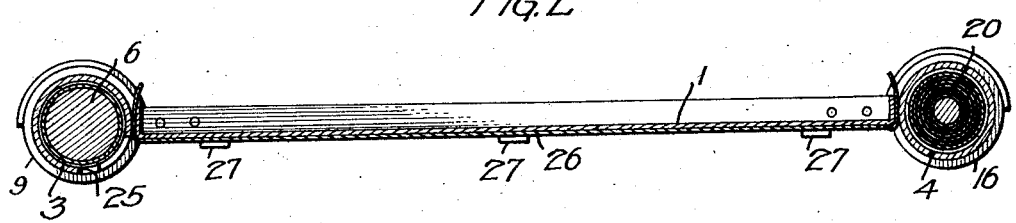
INVENTOR:
JACOB O. TRAUTWEIN,
BY Cheever & Cox
ATTYS.

UNITED STATES PATENT OFFICE.

JACOB O. TRAUTWEIN, OF CHICAGO, ILLINOIS.

CHART HOLDER.

1,416,141.  Specification of Letters Patent.  Patented May 16, 1922.

Application filed March 17, 1920. Serial No. 366,692.

*To all whom it may concern:*

Be it known that I, JACOB O. TRAUTWEIN, a citizen of the United States, residing at Chicago, in the county of Cook and State of Illinois, have invented a certain new and useful Improvement in Chart Holders, of which the following is a specification.

My invention relates to chart holders and has for its object to render it practical to place a plurality of curves or graphs upon a single chart co-extensively as to abscissæ and based upon either similar or dissimilar scales, the scale readings being arranged as ordinates—that is, vertically. For the sake of illustration let it be assumed that a manufacturer of bricks desires to keep a daily record of the various operations in his yard. For example, the number of green brick made, the number of brick set in the kiln, the number of brick completed (burning finished) the number of brick shipped, etc. He may of course plot curves or graphs showing all of these operations on different ruled sheets or charts, but to do so is inconvenient and expensive for the reason that many sheets of papers would have to be provided and handled. It also has the disadvantage of furnishing no ready means for comparing one operation with another on any given day or date. Furthermore, different operations are frequently measured according to different scales. For, example, the records of bricks set may be kept in thousands while the records of bricks shipped may be kept in carloads and if coal receipts are kept they may be in pounds or in tons. My invention contemplates not only the placing of a plurality of curves upon the same sheet and co-extensively as to abscissæ, (or horizontal measurement) but also the provision of means whereby different scales may be readily brought into juxtaposition with the chart sheet, whereby the different curves may be readily interpreted. Another object is to provide a construction rendering the device convenient to handle and also capable of storing charts not temporarily in use or paper from which fresh charts may be made.

I accomplish my objects and purposes by the mechanism illustrated in the accompanying drawings in which—

Figure 1 is an assembly view of the device viewed from the front, certain portions being broken away to reveal the internal structure.

Figure 2 is a plan section on the line 2—2 Figure 1, and

Figure 3 is a development of a portion of the surface of the scale drum illustrating different scales which may be employed. In other words, Figure 3 may be regarded as a fragment of the sheet of paper which is pasted upon the scale drum to exhibit the various scales used in conjunction with the curves upon the chart proper.

Like numerals denote like parts throughout the several views.

In the form selected to illustrate the invention, the device includes a central plate or board 1, rectangular in outline and consisting preferably of light weight sheet metal, flanged at its four marginal edges, to impart stiffness. Cylindrical tubes 3, 4 are fastened at the ends of the plate. The tube 3 (located at the left, Figure 1) contains a drum 6 of a diameter slightly smaller than the internal diameter of the tube, and having at its lower end a trunnion 8 journaled in the cap 9 which forms a closure for the lower end of the tube. At the upper end of the tube is a collar 10 into which screws a plug 12 which is centrally bored to form a bearing for a shaft 11 which is rigidly fastened to the drum for rotating it. The shaft and drum are rotated by means of a small hand wheel 14 which is preferably knurled so that it may be conveniently grasped between the thumb and finger of the operator.

The tube 4 which is fastened to the opposite end of the center plate is closed at the lower end by means of a cap 16 and at the upper end has a collar 17 adapted to be closed by a screw plug 18. The tubes 3 and 4 both perform dual functions, one of which is to form convenient handles or hand holds by which the user may hold the board up in front of him when plotting or reading the charts. A second function of the tube 4 is to furnish storage capacity for a roll 20 of suitably ruled paper from which fresh charts may be made. Likewise, it may be used for storing charts representing past operations.

A second function of the tube 3 at the left is to contain the drum 6, previously mentioned, which drum has one or more sight apertures (in the present case two) which are designated by 21 and 22 and reveal restricted portions of the scale sheets 24, 25 pasted or otherwise secured to the surface of the drum. In Figure 3 I have illustrated a portion of one of the scale sheets, this particular sheet having five different scales a, b, c, d, e. These scales may be graduated in different ways and may indicate various classes of items, but for the sake of illustration I have shown scale a entitled as No. 1 and graduated to show the number of cars of clay delivered: scale b entitled as No. 2 and graduated to show the number of machine made brick in thousands: scale c entitled as No. 3 and graduated to show the number of brick set in thousands: scale d entitled as No. 4 and graduated to show the number of bricks in thousands, unloaded from the kilns: scale e entitled as No. 5 and graduated to show the number of bricks shipped in thousands.

The chart proper, indicated by 26, consists of a suitably ruled sheet on which the curves or graphs may be plotted. While the sheet may be held in various ways without departing from the spirit of the invention, in the present case the ends of the center plate are spaced slightly from the tubes 3, 4 and the ends of the sheet are tucked into these spaces and thus held. The sheet is positioned vertically by gages 27 which in the present form consist of lugs struck out of the metal of which the center plate is composed. The particularly ruled sheet chosen for illustration has a number of equally spaced upright lines numbered from 1 to 31 to represent the different days of the month. The main horizontal lines are spaced equidistantly and the spaces between them are marked by sub-lines for indicating aliquot parts of the main lines. Different values may be ascribed to the horizontal lines for different curves, the values selected being in accordance with the values of the individual scale by which the particular curve is to be interpreted. As will be noted, the tube 3 has two sight apertures one above the other, and the chart sheet has two sets of cross lines to correspond.

In practice, the individual curves or graphs are plotted in accordance with well known principles. In a case such as the one illustrated, to show the operations on a brick yard, the day's operation will be recorded each day on the vertical line or ordinate allotted to that particular day of the month. The height of the curve on that day or the value of the ordinate will be in direct proportion to what is accomplished on the day in question. It is desirable to provide at the left edge of the chart sheet a suitably designated space 30 in which the scale numbers or key numbers of the different curves may be marked. By observing the scale number in space 30 the operator is enabled to determine what scale to rotate to reading position within the sight aperture 24 or 25. If he wishes, in reading the chart, to determine the number of machine made brick, for example, he rotates drum 6 to bring scale No. 2 at the reading position adjacent to space 30 shown in Figure 1. He then directs his attention to the particular curve which commences at the key number 2 in space 30, after which he proceeds to interpret the curve in the manner well known to those accustomed to use graphical charts.

While not at all essential, it is nevertheless possible to employ different colored inks for the different curves thus making it a very simple matter to follow any particular curve even though it may cross and recross the other curves. The fact is, however, that even though the curves occupy the same general positions upon the sheet and may frequently cross each other, it is found in practice to be a simple and easy matter to follow the selected curves from one edge of the sheet to the other.

From the foregoing it will be evident that my device provides an extremely simple and compact means for keeping and interpreting records which may relate to a variety of different subjects indicated upon a variety of different scales. Charts have been made in which a plurality of curves occupy the same general area upon the sheet, but in such cases the scales themselves with one exception, must necessarily be separated by one or more intervening scales from the curves which they are to interpret. This gives rise to confusion and uncertainty. This drawback is avoided by the use of my device, for any required scale may be instantly brought directly to the edge of the sheet without any intervening scales. This feature is of great importance for it not only saves time and care on the part of the user but gives him a feeling of certainty that lends great value to the device. It will be observed that the scale sheets are for the most part protected against wear or damage by being enclosed within a protecting tubular casing.

The device is not confined to any one class of business for different scale sheets may be readily applied to the drum. The drum may be removed at any time by simply unscrewing the plug 12 and lifting it out, and it may be replaced by the reverse operation. The chart sheets themselves need not be changed in form because different values may be ascribed to the horizontal and vertical lines to correspond with the different scales in conjunction with which they are to be read.

Having thus described my invention what I claim as new and desire to secure by Letters Patent, is:—

1. In a computing device, the combination of a chart having a plurality of independent curves, with a plurality of scales, adjustable at will into cooperative relation with said chart, each of said scales cooperating with said chart in a predetermined different factorial relation.

2. In a computing device, the combination of a chart having a plurality of independent curves, with a plurality of scales, adjustable at will into cooperative relation with said chart, each of said curves having different values when brought into cooperable relation with said scales.

In witness whereof, I have hereunto subscribed my name.

JACOB O. TRAUTWEIN.